(12) United States Patent
Inna et al.

(10) Patent No.: US 10,936,500 B1
(45) Date of Patent: Mar. 2, 2021

(54) CONDITIONAL CACHE PERSISTENCE IN DATABASE SYSTEMS

(71) Applicant: MEMHIVE, INC., Dover, DE (US)

(72) Inventors: Naresh Kumar Inna, Bangalore (IN); Keshav Prasad H S, Bangalore (IN)

(73) Assignee: Memhive, Inc., Dover, DE (US)

( * ) Notice: Subject to any disclaimer, the term of this patent is extended or adjusted under 35 U.S.C. 154(b) by 0 days.

(21) Appl. No.: 17/094,776

(22) Filed: Nov. 10, 2020

(51) Int. Cl.
| | |
|---|---|
| *G06F 12/08* | (2016.01) |
| *G06F 12/0891* | (2016.01) |
| *G06F 12/0813* | (2016.01) |
| *G06F 12/0846* | (2016.01) |
| *G06F 12/0864* | (2016.01) |
| *G06F 11/14* | (2006.01) |
| *G06F 11/30* | (2006.01) |
| *G06F 9/30* | (2018.01) |
| *G06F 12/02* | (2006.01) |

(52) U.S. Cl.
CPC ...... *G06F 12/0891* (2013.01); *G06F 9/30047* (2013.01); *G06F 11/1435* (2013.01); *G06F 11/1451* (2013.01); *G06F 11/1469* (2013.01); *G06F 11/3037* (2013.01); *G06F 12/0246* (2013.01); *G06F 12/0813* (2013.01); *G06F 12/0846* (2013.01); *G06F 12/0864* (2013.01)

(58) Field of Classification Search
CPC ............. G06F 12/0246; G06F 12/0891; G06F 12/0868; G06F 11/1469

USPC ........................................................ 711/118
See application file for complete search history.

(56) References Cited

U.S. PATENT DOCUMENTS

| | | | |
|---|---|---|---|
| 2008/0215580 A1* | 9/2008 | Altinel | G06F 16/24552 |
| 2016/0246724 A1* | 8/2016 | Boehm | G06F 12/0804 |
| 2017/0193535 A1* | 7/2017 | Xu | G06Q 30/0202 |
| 2018/0074917 A1* | 3/2018 | Choudhary | G06F 11/1446 |
| 2018/0081767 A1* | 3/2018 | He | G06F 16/2365 |
| 2019/0102309 A1* | 4/2019 | Tao | G06F 12/0871 |

* cited by examiner

*Primary Examiner* — Than Nguyen
(74) *Attorney, Agent, or Firm* — Kanika Radhakrishnan; Evergreen Valley Law Group

(57) ABSTRACT

A database system includes a database server, a DRAM, a persistent memory, and at least one storage media. The database server includes a cache manager. The DRAM stores a buffer hash table and the persistent memory includes a persistent memory database cache including a plurality of buffers. Buffer content in a buffer is conditionally persisted subsequent to a system initialization event based on the respective buffer satisfying one or more predefined conditions. Each buffer is associated with buffer descriptor values corresponding to a plurality of buffer descriptors. The plurality of buffer descriptors includes a first type of buffer descriptors and a second type of buffer descriptors. Modifications to the buffer hash table are routed to the DRAM, and modifications to the buffer content and modifications to buffer descriptor values corresponding to the first type of buffer descriptors are explicitly flushed to the persistent memory database cache.

20 Claims, 8 Drawing Sheets

CONDITIONAL CACHE PERSISTENCE IN DATABASE SYSTEMS

TECHNICAL FIELD

The present technology generally relates to database management systems and, more particularly to, mechanisms enabling conditional cache persistence in database systems.

BACKGROUND

A variety of options are now available for individual users and enterprise users to organize and store digital information. One such option for organizing and storing data is a database, which corresponds to a data structure for storing organized information. Several different types of databases, such as a relational database, a distributed database, an object-oriented database, and the like, are now available to cater to a variety of user needs. Among the several types of databases, one popular type of a database is a relational database, which is a type of database that organizes data into tables which are linked or are related to each other based on data common to the tables.

Relational databases typically are managed using a relational database management system (RDBMS). One or more clients (i.e. user applications) establish a connection with a server associated with the RDBMS to create tables and store data in the tabular format. The server typically uses a storage media, such as hard disk drives (HDDs) and/or solid state drives (SSDs) at the backend for storing user's data in the tabular format. Further, the server may use a Dynamic Random Access Memory (DRAM) to cache content, which is frequently accessed from the storage media.

The current storage architecture, where the cache is maintained on a volatile memory such as DRAM and the user's data is stored on the slower persistent storage media, such as the HDDs and the SSDs, has several drawbacks. For example, it is difficult to vertically scale the current storage architecture to meet the growing demands for increasing data storage capacity. One of the primary challenges in scaling the current storage architecture is the scaling of the DRAM. Increasing DRAM capacity is an expensive option and moreover, there is a limit to a size of DRAM that can be included in a database system, which hinders scaling of the storage architecture.

In addition to the challenges in scaling the storage architecture, another drawback of the current storage architecture is the variance in query latency. When the server is restarted either due to a planned or an unplanned event, since the contents of the DRAM cache are lost during the restart, the cache has to be warmed up again, which leads to the variance in query latency. The variance in query latency may be unacceptable in scenarios where the server is attempting to meet client Service Level Agreements (SLAs).

For the aforementioned reasons, there is a need to enable vertical scaling of the storage architecture without incurring high costs while retaining DRAM-like low access latency and memory-like access to cached content. It would also be advantageous to address the query latency variance drawback of the current storage architecture.

SUMMARY

In an embodiment of the invention, a database system is disclosed. The database system includes a database server, a Dynamic Random Access Memory (DRAM), a persistent memory, and at least one storage media. The database server includes a memory module, a processing module and a cache manager. The memory module stores instructions for creating and operating a plurality of databases. The processing module is configured to execute the instructions stored in the memory module. The processing module is associated with at least one processor cache. The at least one storage media is configured to store the plurality of databases. The persistent memory is controlled, at least in part, by the cache manager. The persistent memory includes a persistent memory database cache. The persistent memory database cache includes a plurality of buffers. Each buffer is capable of storing a copy of data corresponding to at least one page associated with a database from among the plurality of databases. Buffer content stored in a buffer of the persistent memory database cache is conditionally persisted subsequent to a system initialization event based on the respective buffer satisfying one or more predefined conditions. Each buffer is associated with a plurality of buffer descriptor values corresponding to a plurality of buffer descriptors. The plurality of buffer descriptors includes a first type of buffer descriptors and a second type of buffer descriptors. The plurality of buffer descriptor values associated with each buffer is stored in the persistent memory database cache. The DRAM is in operative communication with the database server and is configured to store a buffer hash table including a plurality of buffer tags. Each buffer tag from among the plurality of buffer tags is capable of uniquely identifying a buffer from among the plurality of buffers. Modifications to the buffer hash table are routed to the DRAM, and modifications to the buffer content and modifications to buffer descriptor values corresponding to the first type of buffer descriptors are explicitly flushed to the persistent memory database cache in the persistent memory.

In an embodiment of the invention, a method for operating a database system is disclosed. The method includes controlling a persistent memory by a cache manager in a database server of the database system. The persistent memory includes a persistent memory database cache. The persistent memory database cache includes a plurality of buffers. Each buffer is capable of storing a copy of data corresponding to at least one page associated with a database from among a plurality of databases stored in at least one storage media of the database system. Buffer content in a buffer of the persistent memory database cache is conditionally persisted subsequent to a system initialization event based on the respective buffer satisfying one or more predefined conditions. The method includes storing a buffer hash table in a Dynamic Random Access Memory (DRAM) associated with the database system and the cache manager in operative communication with the DRAM. Each buffer is associated with a plurality of buffer descriptor values corresponding to a plurality of buffer descriptors. The plurality of buffer descriptors includes a first type of buffer descriptors and a second type of buffer descriptors. The plurality of buffer descriptor values associated with each buffer is stored in the persistent memory database cache. Modifications to the buffer hash table are routed to the DRAM, and modifications to buffer content and modifications to buffer descriptor values corresponding to the first type of buffer descriptors are explicitly flushed to the persistent memory database cache in the persistent memory.

In an embodiment of the invention, a cache manager is disclosed. The cache manager includes a communication module and an instruction module. The communication module is configured to enable the cache manager to communicate with a database server and a Dynamic Random Access Memory (DRAM). The DRAM stores a buffer hash table. The instruction module stores instructions for operating a persistent memory. The persistent memory includes a persistent memory database cache. The persistent memory database cache includes a plurality of buffers. Each buffer is associated with a plurality of buffer descriptor values corresponding to a plurality of buffer descriptors. The plurality of buffer descriptors includes a first type of buffer descriptors and a second type of buffer descriptors. The plurality of buffer descriptor values corresponding to the plurality of buffer descriptors for each buffer is stored in the persistent memory database cache. At least one instruction from among the instructions is configured to conditionally persist buffer contents in the persistent memory database cache subsequent to a system initialization event. Further, at least one instruction from among the instructions is configured to facilitate routing of modifications to the buffer hash table to the DRAM and explicit flushing of modifications to buffer contents and modifications to buffer descriptor values corresponding to the first type of buffer descriptors to the persistent memory database cache.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1A:
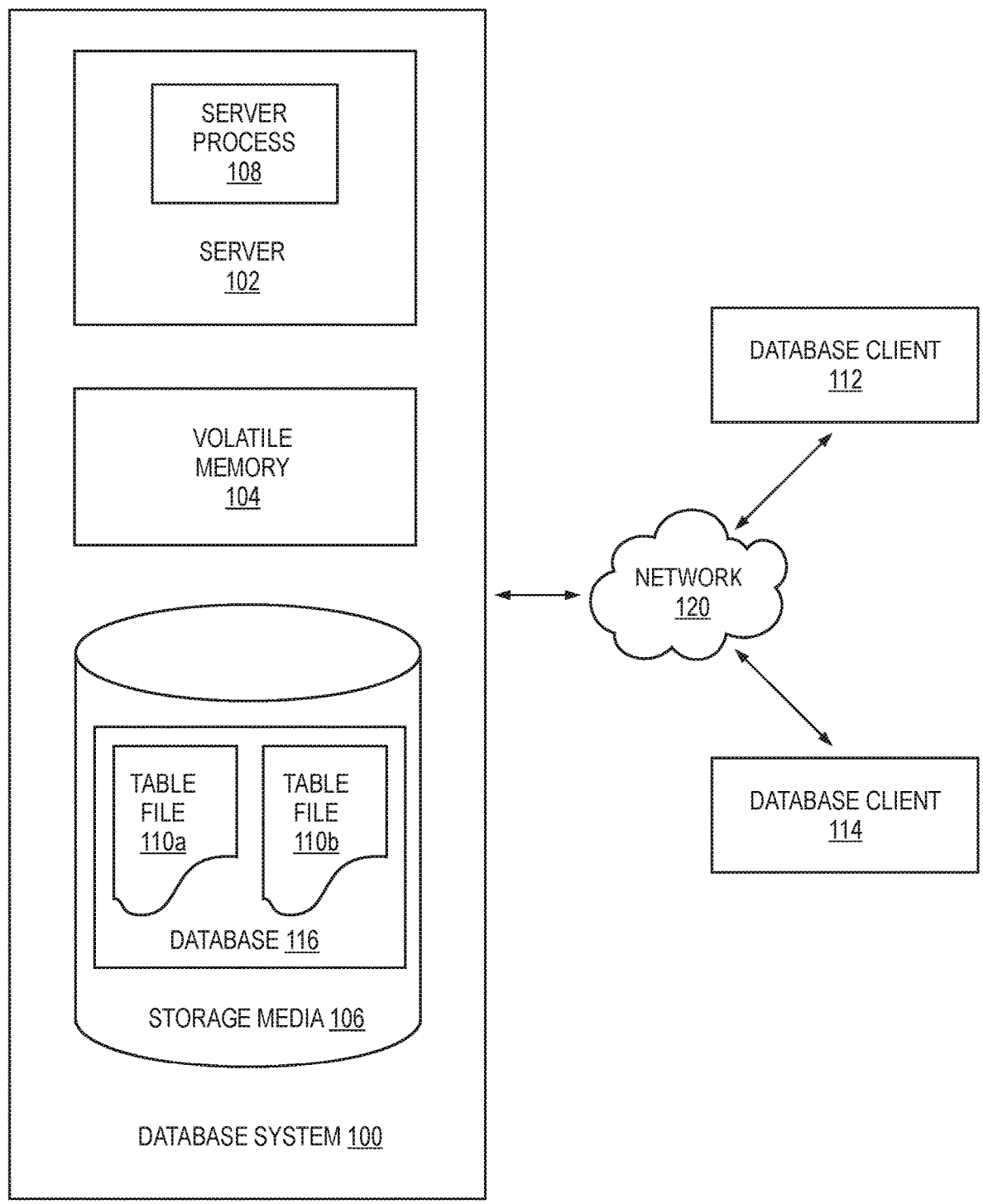
FIG. 1A is a simplified representation of a conventional database system in accordance with an example scenario.

FIG. 1A is a simplified representation of a conventional database system 100 in accordance with an example scenario. The database system 100 is configured to store user data in data structures, referred to herein as databases. In one illustrative example, the database system 100 may be embodied as a relational database system. The relational database system is configured to store user data in a tabular data structure, i.e. in tables. The tables configuring a relational database are linked or related to each other by some commonality in data stored in the tables. For example, at least one attribute, such as a column field, may be common to the tables configuring a relational database. The tables configuring a relational database are also interchangeably referred to herein as 'table files' or 'database files'.

The database system 100 is depicted to include a server 102, a volatile memory 104 and a storage media 106. The server 102 includes an associated set of instructions for operating the database system 100. More specifically, the server 102 may include instructions for creating relational databases and associated table files, modifying content in the table files, and deleting table files and/or relational databases.

Users, such as individual users and/or enterprise users, may utilize the database system 100 for organizing and storing user data. A user may use a database application, hereinafter referred to as a database client, for connecting with the server 102. Two example database clients are shown as a database client 112 and a database client 114 in FIG. 1A for illustration purposes. It is understood that a plurality of database clients, such as the database clients 112 and 114, may connect with the server 102 for utilizing the services of the database system 100 for organizing and storing user data. The connection between the server 102 and a database client may be established over a communication network, exemplarily depicted as a network 120. The network 120 may be embodied as a wired network, a wireless network or a combination of wired and wireless networks. Some non-limiting examples of the wired network may include a local area network (LAN), Ethernet, and the like. Some non-limiting examples of the wireless network may include a cellular network, a wireless LAN (WLAN), a Bluetooth or ZigBee network, and the like. A non-limiting example of a combination of the wired and wireless networks may include the Internet. In one illustrative example, a database client may connect to the server 102 using Transmission Control Protocol (TCP) connection.

The server 102 may be configured to initiate a server process corresponding to each connected database client. It is understood that the server 102 may run several foreground and background server processes for effective management of the database system 100. Some of these server processes may be dedicated or shared among client requests. However, the term 'server process' as used throughout the description refers to the setting-up of a session for a database client for dedicatedly handling requests for the respective database client. It is noted that a plurality of server processes may be executed in parallel by the server 102 with each server process set-up in relation to a single database client. The database client may provide 110 requests in the form of queries, using a known language format such as structured query language (SQL), to the server 102, and the respective server process in the server 102 may be configured to interpret the I/O requests and generate instructions to create and operate a database as per the client requests. FIG. 1A depicts an example server process 108 initiated by the server 102 for servicing I/O requests from the database client 112.

In one illustrative example, one or more table files, such as the table files 110a and 110b may be created and operated by the server process 108 in response to the I/O requests from the database client 112. It is noted that the table files 110a and 110b may at least in part configure a database, such as a database 116, operated by the server 102 for the database client 112. The tables files created and operated in relation to the database clients are stored in the storage media 106. The storage media 106 may be embodied as Hard Disk Drives (HDDs), Solid State Drives (SSDs) or any such form of persistent disk storage. An example table file used for storing database content is shown in FIG. 1B.

Figure 1B:
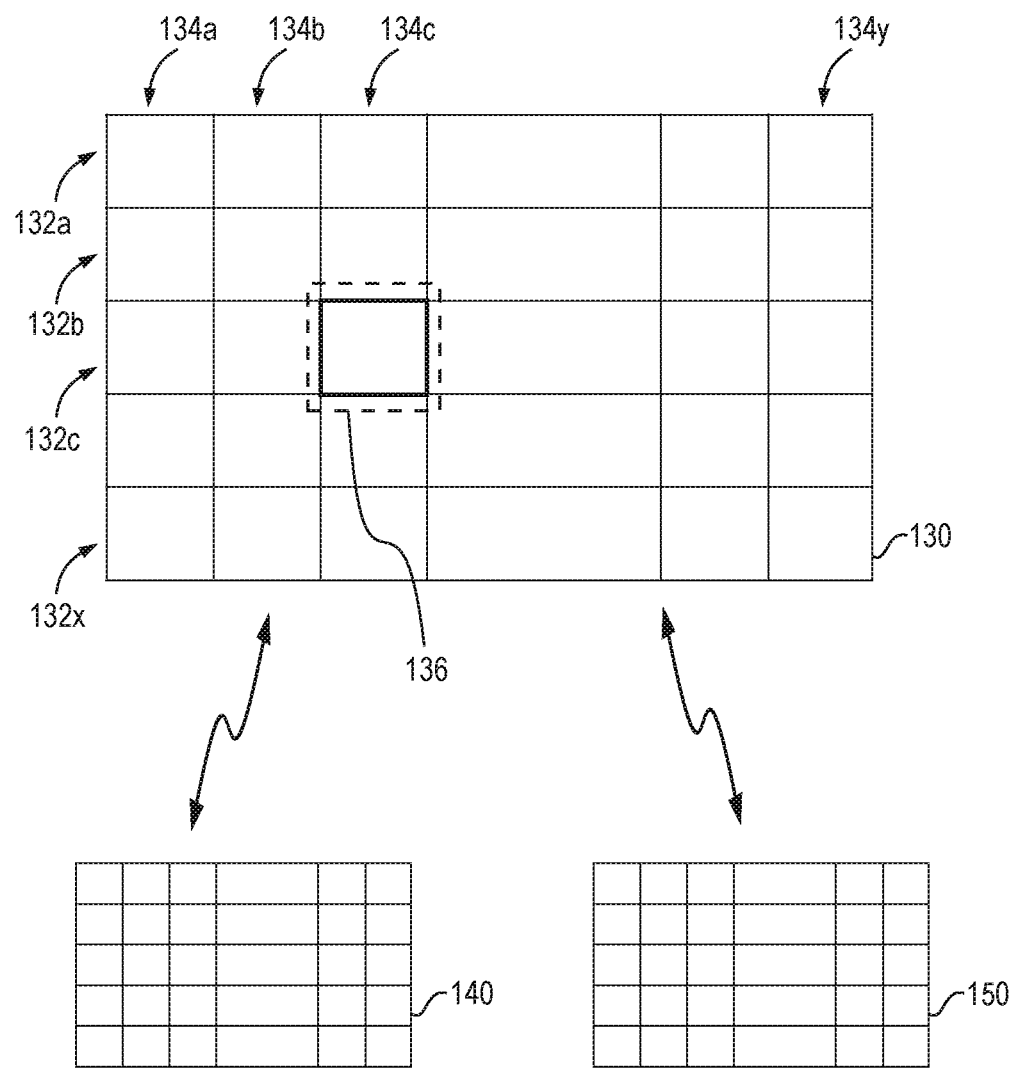
FIG. 1B is a representation of an example table file for storing at least a part of a database content, in accordance with an example scenario.

FIG. 1B is a representation of an example table file 130 for storing at least a part of a database content, in accordance with an example scenario. The table file 130 is depicted to be embodied as a table including a plurality of rows, such as rows 132a, 132b, 132c to 132x, and a plurality of columns, such as columns 134a, 134b, 134c to 134y. The intersection of each row and column configures a cell, such as a cell 136 configured by an intersection of the row 132c and the column 134c. Each cell is capable of storing data, such as for example alphabets, numbers, alphanumeric characters, text symbols or any combinations thereof, corresponding to the database associated with the respective database client. The table content may be accessed in chunks of predefined size, such as for example a chunk of 8 k bytes, also referred to herein as a page. Each page is capable of being addressed using an offset from the beginning of the table file 130. The content associated with a page can be modified and/or deleted as per request from the database client.

The table file 130 may be linked or related to one or more other tables, such as table file 140 and table file 150. It is understood that in some cases, the table file 130 may be the standalone file in a database, or alternatively the database may include several table files such as the table file 130, the table file 140 and the table file 150. The link or relationship between two or more tables may be established by a commonality in attributes (such as same column attribute) in different tables.

It is noted that the term 'creating a database' to organize and store data corresponding to a client as used throughout the description implies creating one or more database files or table files, such as the table file 130, which are related to each other. Further, the term 'operating a database' as used throughout the description implies adding rows and/or columns to the table files, deleting rows and/or columns and/or altering or modifying data stored in pages in the table files.

Referring back to FIG. 1A, the pages that are frequently accessed by clients may be stored in a cache to provide fast access to data to a database client by avoiding the need to access the slower storage media 106. Accordingly, the server 102 may cache frequently accessed pages in the volatile memory 104. The volatile memory 104 may be embodied as a Dynamic Random Access Memory (DRAM) or a Static Random Access Memory (SRAM), which provides fast access to the pages of a table file of a database. However, maintaining the cache on the volatile memory 104 and the user data on the slower storage media 106, such as HDDs and/or SSDs, has several drawbacks. For example, it is difficult to vertically scale the current storage architecture to meet the growing demands for increasing data storage capacity. One of the primary challenges in scaling the current storage architecture is the scaling of the DRAM. Increasing DRAM capacity is an expensive option and moreover, there is a limit to a size of DRAM that can be included in a storage device, which hinders scaling of the storage architecture. In addition to the challenges in scaling the storage architecture, another drawback of the current storage architecture is the variance in query latency. When the server is restarted either due to a planned or an unplanned event, since the contents of the DRAM cache are lost during the restart, the cache has to be warmed up again, which leads to the variance in query latency. The variance in query latency may be unacceptable in scenarios where the server is attempting to meet client Service Level Agreements (SLAs).

Accordingly, the present invention proposes a database system configured to overcome the aforementioned drawbacks and provide additional advantages. The database system of the present invention is explained next with reference to FIG. 2.

Figure 2:
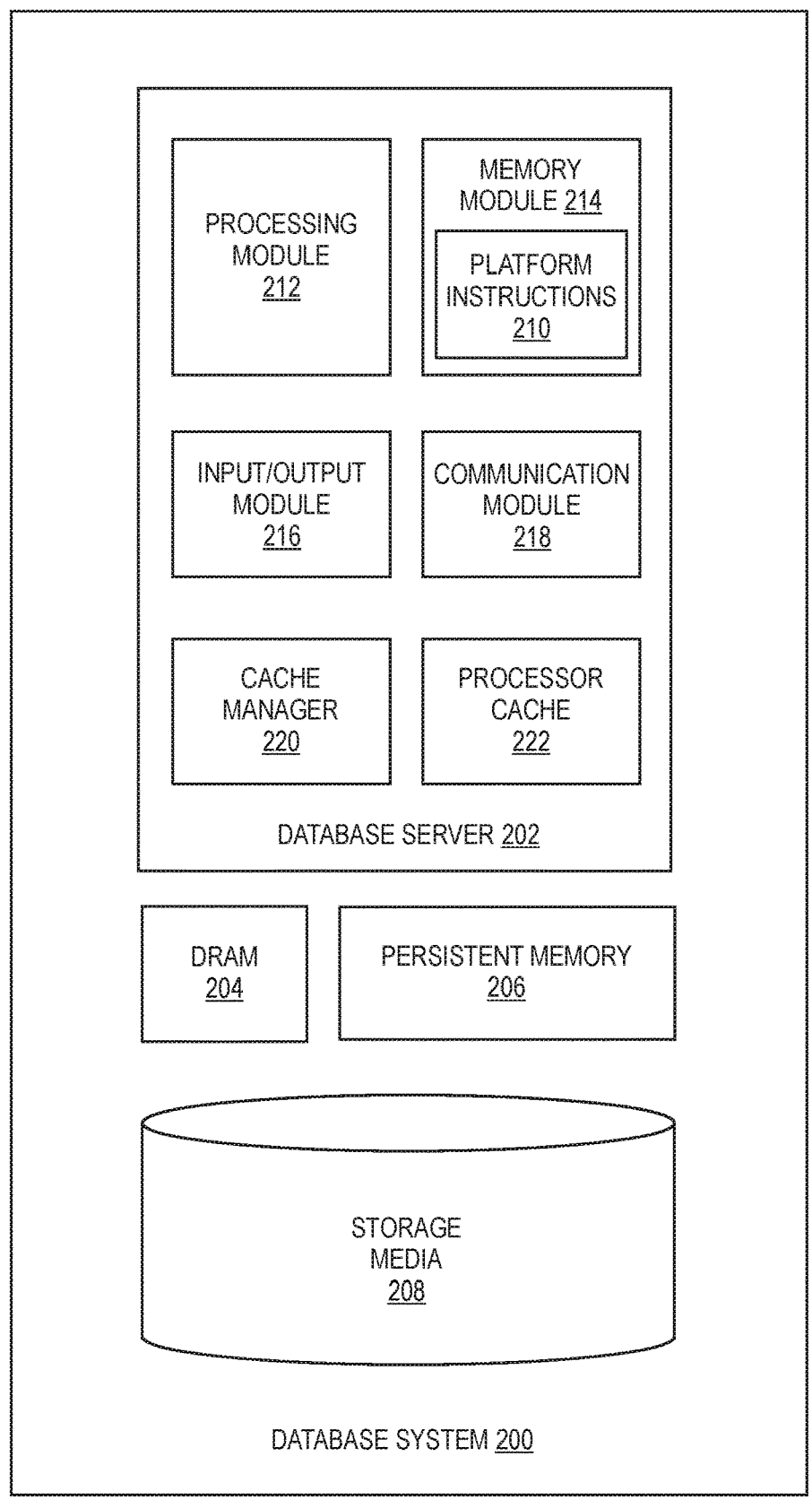
FIG. 2 is a block diagram of a database system, in accordance with an embodiment of the invention.

FIG. 2 is a block diagram of a database system 200, in accordance with an embodiment of the invention. The database system 200 is configured to facilitate creation and operation of a plurality of databases by database clients. In at least one embodiment, the databases correspond to relational databases. Further, as explained with reference to FIGS. 1A and 1B, a database client may correspond to an application, for example a database application, installed in a user's electronic device for facilitating access to, and operating, one or more databases created and operated for the respective user. A database client is also interchangeably referred to hereinafter as a 'client'.

In FIG. 2, the database system 200 is depicted to include a database server 202, a DRAM 204, a persistent memory 206 and at least one storage media, such as the storage media 208. In at least one embodiment, the database server 202 may be embodied as an improved relational database management system server capable of conditionally persisting database cache on the persistent memory 206 as will be explained in detail with reference to FIGS. 2 to 6. In one embodiment, the improved relational database management system server may further be based on PostgreSQL (referred to hereinafter as Postgres). The Postgres based database server 202 may be configured to initiate a server process for each connected client to handle all queries issued by respective connected client. It is noted that a server process initiated by the database server 202 based on Postgres may operate only one database at a time, and accordingly, the client may be required to specify the database to be used when connecting to the database server 202 based on Postgres.

The persistent memory 206 may be configured by using one or more persistent memories. One non-limiting example of a persistent memory is a Storage Class Memory (SCM). The persistent memories may be grouped into regions, and individually addressable namespaces may be formed based on the regions. In one embodiment, a Direct Access (DAX) namespace type allows the persistent memory 206 to be natively mapped as an application memory, eliminating the need for the database server 202 to cache files in the DRAM 204, as well as need for kernel paths involved in performing input/output operations. More specifically, the persistent memory 206 is capable of providing direct application-like access (i.e. byte addressable access) to buffer contents stored therein.

To this effect, a file system such as a direct access (DAX) file system (shown in FIG. 3) may be stored in the persistent memory 206. The DAX file system is configured to map buffers in the persistent memory 206 to original copies of the data stored in the storage media 208. The DAX file system is configured to provide direct application-like access (i.e. byte addressable access) to buffers in the persistent memory 206. During system initialization, the database server 202 may mount the DAX file system and map a file in the DAX file system to bring up a persistent memory database cache and make it available to the applications (or server processes). The cached database contents in the persistent memory database cache are conditionally persisted subsequent to system initialization events as will be explained in detail later.

The storage media 208 may include one or more types of disks, configured to persistently store data corresponding to a plurality of databases created and operated by a plurality of database clients. For example, the storage media 208 may include hard disk drives (HDDs) or solid-state drives (SSDs) or a combination of HDDs and SSDs.

The database server 202 is further depicted to include a processing module 212, a memory module 214, an input/output module 216, a communication module 218 and a cache manager 220. It is noted that although the database server 202 is depicted to include the processing module 212, the memory module 214, the I/O module 216, the communication module 218 and the cache manager 220, in some embodiments, the database server 202 may include more or fewer components than those depicted herein. The various components of the database server 202 may be implemented using hardware, software, firmware or any combinations thereof.

In one embodiment, the processing module 212 may be embodied as a multi-core processor, a single core processor, or a combination of one or more multi-core processors and one or more single core processors. For example, the processing module 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In one embodiment, the memory module 214 is capable of storing machine executable instructions, referred to herein as platform instructions 210. The platform instructions 210 may, at least in part, include instructions corresponding to a database operating system for creating and operating a plurality of databases. The memory module 214 further stores instructions for creating and operating a plurality of server processes in relation to a plurality of database clients. Each server process created and operated in relation to a database client may be associated with at least one database from among the plurality of databases. The memory module 214 may be embodied as one or more non-volatile memory devices, one or more volatile memory devices and/or a combination of one or more volatile memory devices and non-volatile memory devices. For example, the memory module 214 may be embodied as semiconductor memories, such as flash memory, mask ROM, PROM (programmable ROM), EPROM (erasable PROM), RAM (random access memory), etc. and the like.

The processing module 212 is configured to execute the instructions stored in the memory module 214. For example, the processing module 212 is capable of executing the platform instructions 210. In an embodiment, the processing module 212 may be configured to execute hard-coded functionality. In an embodiment, the processing module 212 is embodied as an executor of software instructions, wherein the instructions may specifically configure the processing module 212 to perform the algorithms and/or operations described herein when the instructions are executed.

The processing module 212 is configured to be associated with at least one processor cache, such as a processor cache 222. In one illustrative example, the processing module 212 may be associated with several levels of Central Processing Unit (CPU) caches, such as an L1 cache, an L2 cache, an L3 cache, etc. One or more such CPU caches are collectively referred to as a processor cache and represented as the processor cache 222 in FIG. 2.

In an embodiment, the I/O module 216 may include mechanisms configured to receive inputs from and provide outputs to the operator of the database system 200. The term 'operator of the database system 200' as used herein may refer to one or more individuals, whether directly or indirectly, associated with managing the database system 200. To enable reception of inputs and provide outputs to the database system 200, the I/O module 216 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In an example embodiment, at least one module of the database system 200 may include I/O circuitry (not shown in FIG. 2) configured to control at least some functions of one or more elements of the I/O module 216. The module of the database system 200 and/or the I/O circuitry may be configured to control one or more functions of the one or more elements of the I/O module 216 through computer program instructions stored on a memory, for example, the memory module 214, and accessible to the processing module 212 of the database system 200.

The communication module 218 is configured to facilitate communication between the database system 200 and one or more remote entities over a communication network, such as the network 120 shown in FIG. 1A. For example, the communication module 218 is capable of facilitating communication with electronic devices of a plurality of users. More specifically, the communication module 218 is capable of facilitating communication with a plurality of database clients, such as the clients 112 and 114 shown in FIG. 1A. In an illustrative example, the database server 202 based on Postgres may initiate a server process to handle all query requests issued by a connected client. In at least some embodiments, the communication module 218 may enable the server process to communicate with the client over a single Transmission Control (TCP) connection, which is terminated when the client gets disconnected.

The cache manager 220 is configured to be in operative communication with the DRAM 204 and the persistent memory 206. The cache manager 220 is configured to intelligently use the combination of DRAM 204 and the persistent memory 206 to persist the cache contents.

As explained with reference to FIG. 1A, conventional architectures only use a volatile memory, such as a DRAM, to cache content of databases. The term 'caching of content' as used herein implies maintaining a copy of frequently accessed content from among the database content stored in the storage media. The present invention proposes to use a combination of DRAM and persistent memory for storing database cache content. The use of persistent memory, such as the persistent memory 206, enables cost-effective scaling of the database storage architecture as scaling the persistent memory is not as cost prohibitive as scaling expensive DRAM and, moreover a size (i.e. in relation to the storage capacity) of the persistent memory that can be included in a database system is substantially larger than the size of DRAM that can be included in a database system. Further, being on persistent memory 206, the contents of the cache are persisted across system initialization events, such as planned restarts or power cycle events. As a result, the concern of query latency variance is also addressed, since the contents of the cache are always warm across restarts of the database system 200.

To maintain persistence of contents stored in the persistent memory 206, the database server 202 and, more specifically, the processing module 212 of the database server 202, triggers a flush operation after every store operation executed by a server process. The flush operation triggered after every store operation is also referred to herein as 'explicit flushing' or the explicit execution of the flush operation. The flush operation is configured to flush data from the processor cache 222 to at least one buffer of the persistent memory 206. Further, the processing module 212 of the database server 202 is also configured to execute a drain operation to ensure preceding flushes are persistent, i.e. a flushing of data up to a certain sequence order of flush operations is completed and the corresponding data now resides on the persistent memory 206. It is noted that a drain operation is a blocking operation, i.e. the drain operation blocks a thread of execution of the current server process till all preceding store operations have reached the persistent memory 206. The frequent use of the flush and drain operations for maintaining the persistence of contents stored in the persistent memory 206 may affect a caching performance of the database system 200.

Accordingly, the cache manager 220 is provided to intelligently manage the caching of database contents on the persistent memory 206. For example, the cache manager 220 is configured to cause the processing module 212 to either delay execution of the drain operation or suppress explicit execution of the flushing and drain operations for certain type of operations. The term 'the cache manager 220 causing the processing module 212' as used herein and throughout the description implies that the cache manager 220 is configured to communicate with the processing module 212 of the database server 202 using firmware or API calls and control, i.e. either delay or withhold execution of certain type of instructions by the processing module 212 to ensure cache persistence and also optimize the use of the persistent memory 206 to improve caching efficiency.

For example, the cache manager 220 may cause the processing module 212 to delay execution of a drain operation till one or more predetermined factors in relation to the writing of the data to at least one buffer are satisfied. In another illustrative example, the cache manager 220 causes the processing module 212 to suppress explicit execution of the flush and drain operations with respect to modifications to certain type of buffer metadata or with respect to bulk type of operations as will be explained in detail with reference to FIGS. 3, 4 and 5. As a result, unnecessary flush and drain operations are avoided, which improves caching performance.

Further, the cache manager 220 is configured to use a combination of the DRAM 204 and the persistent memory 206 to persist the cache contents. The cached contents in the persistent memory 206 are also conditionally persisted based on factors detected during a system initialization event as will be explained in detail later with reference to FIGS. 3 and 4. Furthermore, the cache manager 220 is also configured to handle hardware errors in the persistent memory 206 such that a system initialization time is reduced.

As explained above, using the persistent memory 206 for persisting database cache contents and using the cache manager 220 to intelligently control the persistent memory 206 overcome several drawbacks of caching mechanisms used in conventional database storage architectures and provide additional advantages that enable optimal caching of contents in relational database storage architectures. The various embodiments of the present invention are explained in further detail hereinafter.

Figure 3:
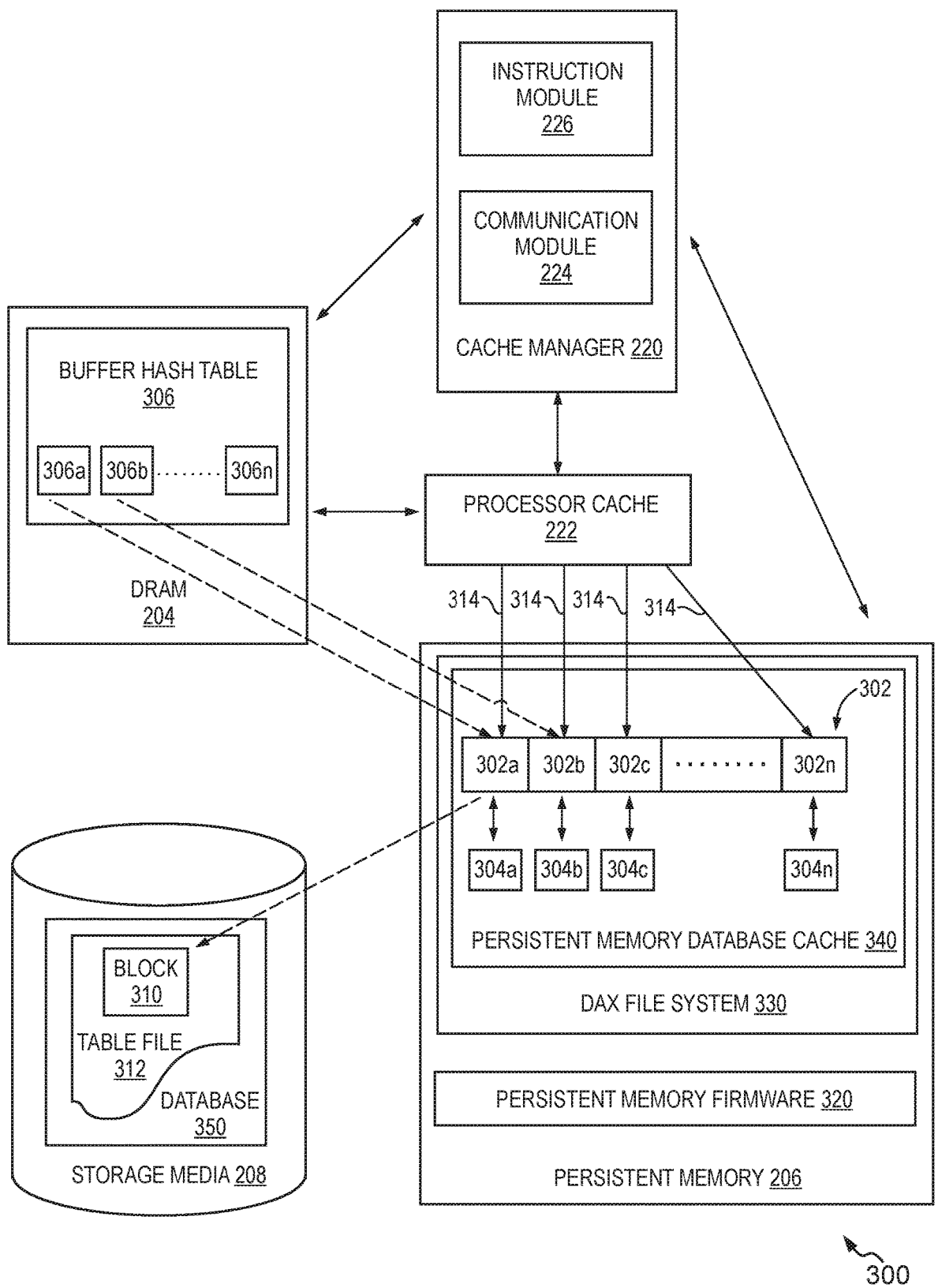
FIG. 3 is a block diagram illustrating a cache manager in operative communication with a DRAM and a persistent memory, in accordance with an embodiment of the invention.

FIG. 3 is a block diagram 300 illustrating a cache manager 220 in operative communication with the DRAM 204 and the persistent memory 206, in accordance with an embodiment of the invention.

The cache manager 220 is depicted to include a communication module 224 and an instruction module 226. The communication module 224 is configured to enable the cache manager 220 to communicate with the processing module 212 of the database server 202 (shown in FIG. 2), the DRAM 204 and the persistent memory 206. The instruction module 226 is configured to store instructions for operating the persistent memory 206. For example, an instruction from among the instructions stored in the instruction module 226 is configured to conditionally persist buffer contents in the persistent memory 206 subsequent to a system initialization event. In another illustrative example, an instruction stored in the instruction module 226 is configured to facilitate routing of modifications of cached metadata content to one of the DRAM 204 and the persistent memory 206.

The persistent memory 206 is depicted to include a persistent memory firmware 320 and a direct access (DAX) file system 330. The DAX file system 330 may be configured to cache contents related to one or more databases. Accordingly, the DAX file system 330 is depicted to include a persistent memory database cache 340. The persistent memory database cache 340 is depicted to include a plurality of buffers, shown as a contiguous array of fixed size buffers, and hereinafter referred to as plurality of buffers 302. Some example buffers from among the plurality of buffers 302 are shown as a buffer 302a, a buffer 302b, a buffer 302c and a buffer 302n in FIG. 3. Each buffer from among the plurality of buffers 302 is capable of storing a copy of data corresponding to a block of a table file, such as a block 310 of a table file 312 associated with a database 350. It is noted that the database 350 is depicted to include one table file in the form of the table file 312 for illustration purposes and that the database 350 may include two or more table files, such as the table file 312. The block 310 in the table file 312 may be located at an offset from the start of the table file 312 and the block 310 may be capable of storing data worth 8K bytes, i.e. worth a page of table file 312.

Further, each buffer is associated with a plurality of buffer descriptor values corresponding to a plurality of buffer descriptors. The plurality of buffer descriptor values configures the buffer metadata corresponding to each buffer. As an illustrative example, the buffer 302a is depicted to be associated with buffer metadata 304a, the buffer 302b is depicted to be associated with buffer metadata 304b, the buffer 302c is depicted to be associated with buffer metadata 304c and the buffer 302n is depicted to be associated with buffer metadata 304n. The buffer metadata corresponding to each buffer is stored in the persistent memory database cache 340. The plurality of buffer descriptors is further explained with reference to FIG. 4.

Figure 4:
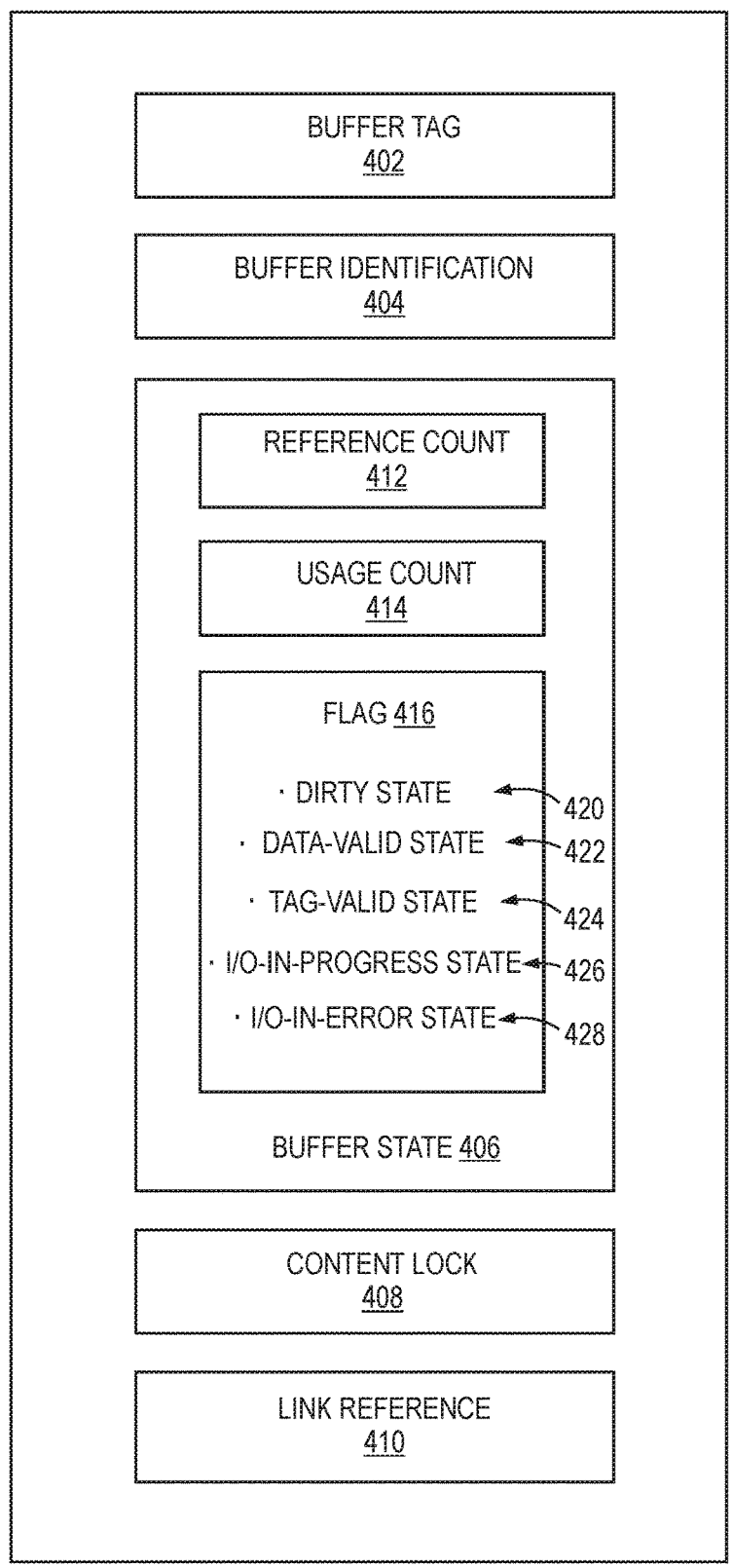
FIG. 4 shows a representation for illustrating example buffer descriptors used in relation to each buffer in the persistent memory database cache, in accordance with an embodiment of the invention

Referring now to FIG. 4, a representation 400 is shown for illustrating example buffer descriptors used in relation to each buffer in the persistent memory database cache 340, in accordance with an embodiment of the invention. As an example, the representation 400 shows a plurality of buffer descriptors, such as a buffer tag 402, a buffer identification (ID) 404, a buffer state 406, a content lock 408 and a link reference 410.

The buffer tag 402 is a tuple made up of identifiers of the database, the table file within the database, and a block (or a page) number within the table file. The buffer tag is used to fetch a page in a table file, whereas a buffer ID 404 is an index into an array of buffers. The buffer ID points to its corresponding buffer in the persistent memory database cache 340.

The buffer state 406 is configured to indicate the current state of a respective buffer using at least one of a reference count 412, a usage count 414 and a flag 416. The reference count 412 corresponds to a current count of server processes accessing the respective buffer, whereas the usage count 414 corresponds to a total number of accesses to the respective buffer. The flag 416 is configured to indicate a buffer state from among a dirty state 420, a data-valid state 422, a tag-valid state 424, an I/O-in-progress state 426 and an I/O-in-error state 428. It is noted that the flag 416 may be configured to indicate fewer or more buffer states than those depicted herein.

The content lock 408 is configured to indicate whether a buffer is locked in an exclusive mode or not. The buffer is locked in the exclusive mode prior to any modifications to the contents of the buffer. Subsequent to the completion of the modifications to the contents of the buffer, the state of the buffer is set to the dirty state 420, which is indicative of the fact that the data present in a buffer in the persistent memory database cache 340 is yet to be transferred to the storage media 208 (shown in FIG. 2). After setting the buffer state to the dirty state 420, the buffer is unlocked.

The link reference 410 is an index to a free list chain (not shown in FIG. 4). The link reference 410 is capable of assuming a signed integer value, which is indicative of whether the buffer is in a free list or not. More specifically, the buffers in the persistent memory database cache 340, which are currently not storing any data are referred to as free buffers and such buffer IDs are recorded in a free list. Each free buffer is configured to point to one next free buffer or to an end of the free list, thereby configuring the free list chain. For example, the first free buffer (i.e. the zeroth buffer) is configured to point to the next free buffer, which then is configured to point to the next free buffer and so on and so forth till the last free buffer points to the end of the free list, which configures the free list chain. The signed integer value associated with each buffer is configured to indicate an index of the buffer in the free list or whether the buffer (i.e. the corresponding buffer ID) is present in the free list or not. In an illustrative example, a 'positive value of the signed integer' indicates the index of the next free buffer. For example, the zeroth buffer pointing to the next free buffer is associated with a signed integer value of 0, the next free buffer is associated with a signed integer value of 1 and so on. A minus 1 or '−1' value of the signed integer is configured to indicate an end of the free list, i.e. the last free buffer is associated with the signed integer value of −1. A signed integer value of '−2' associated with a buffer is configured to indicate that the buffer is not present in the free list, i.e. the buffer is storing data or the buffer is currently in use. In at least one embodiment of the present invention, the cache manager 220 (shown in FIG. 3) is further configured to assign a predefined link reference value, i.e. a signed integer value of '−3', to indicate that the buffer is not present in the free list, as well as to indicate that the buffer is assigned to a special type of operation, such as a bulk type of operation, as will be explained in further detail with reference to FIG. 5.

As explained with reference to FIG. 3, the values corresponding to the plurality of buffer descriptors, such as the plurality of buffer descriptors explained with reference to FIG. 4, configure the buffer metadata corresponding to each buffer. In at least one embodiment, the buffer tag 402, the buffer ID 404, the flag 416, the content lock 408 and the link reference 410 configure the first type of buffer descriptors and, wherein the reference count 412 and the usage count 414 configure the second type of buffer descriptors.

Referring back to FIG. 3, the DRAM 204 is configured to store a buffer hash table 306 including a plurality of buffer tags, such as a buffer tag 306a, a buffer tag 306b and a buffer tag 306n. Each buffer tag is configured to uniquely identify a buffer from among the plurality of buffers. More specifically, each buffer tag is mapped to a unique buffer ID of a buffer in the persistent memory database cache 340.

In at least one embodiment, a server process of the database server 202 (shown in FIG. 2) uses a buffer tag to read a buffer from the persistent memory 206. The cache manager 220 is configured to compare the buffer tag with the plurality of buffer tags in the buffer hash table 306 in the DRAM 204 and, subsequent to finding a match, obtain a buffer ID mapped to the matching buffer tag. The cache manager 220 is thereafter configured to look-up the buffer ID in the buffer metadata associated with the plurality of buffers 302. The flags, reference counts and usage counts are then used to determine whether the requested data available in a buffer is in persistent memory database cache 340 (i.e. cache hit), whether the buffer data is valid, or if a new buffer is needed (cache miss), whether free buffers are available (from the free list), or if a victim buffer needs to be identified and its data need to be written.

In the case when data is written to the buffer, the cache manger 220 is configured to set the flag of the respective buffer to a dirty state (such as the dirty state 420 shown in FIG. 4) after the data is written into the buffer.

The buffer hash table 306 and the persistent memory database cache 340, or more specifically the buffer contents in the plurality of buffers 302, the buffer metadata associated with the plurality of buffers 302 and buffer hash table 306 together configure the database cache of the database system 200 (shown in FIG. 2). The placement of the buffer hash table 306 in the DRAM 204 and the buffers and the respective buffer metadata in the persistent memory database cache 340 of the persistent memory 206, as proposed in the present invention, improves caching performance as the buffer tag lookup may be quickly performed in the DRAM 204. Moreover, a size of the buffer hash table 306 as compared to the buffers and the buffer metadata is negligible to enable storing of the buffer hash table 306 in the DRAM 204. Further, as the buffer hash table 306 includes system pointers that do not need to be persisted, and moreover, the buffer hash table 306 can be built up during system initialization in a negligible amount of time, the placement of the buffer hash table 306 in the DRAM 204 supports cache persistence in the persistent memory 206 while improving the caching performance.

In at least one embodiment, the cache manager 220 is configured to route modifications to the buffer hash table 306 to the DRAM 204 and explicitly flush modifications to the buffer contents to the persistent memory database cache 340. More specifically, if there is any change in the content stored in a buffer from among the plurality of buffers 302, then such a modification (i.e. changed content) may be flushed from the processor cache 222 to the respective buffer immediately after the modified content is stored in the processor cache 222. From among the modifications to the buffer metadata, the cache manager 220 is configured to explicitly flush modifications to buffer descriptor values corresponding to the first type of buffer descriptors to the persistent memory database cache 340. The routing, or transferring of the content from the processor cache 222 to one of the DRAM 204 and the persistent memory 206 is further explained hereinafter.

As explained with reference to FIG. 4, the plurality of buffer descriptors may be classified into first type of buffer descriptors and a second type of buffer descriptors. In one illustrative example, the buffer tag 402, the buffer ID 404, the flag 416, the content lock 408 and the link reference 410 configure the first type of buffer descriptors and, whereas the reference count 412 and the usage count 414 configure the second type of buffer descriptors. The buffer descriptor values corresponding to each of the first type and second type of buffer descriptors, together, configure the buffer metadata. The classification of the buffer descriptors into the first type of buffer descriptors and the second type of buffer descriptors may be performed primarily to separate the type of buffer descriptors (such as the first type of buffer descriptors) that needs to be persisted as these buffer descriptor values are required if a database system, such as the database system 200 shown in FIG. 2, undergoes a restart event as opposed to a type of buffer descriptors (such as the second type of buffer descriptors) that may not be needed if the database system undergoes a restart event. Accordingly, the cache manager 220 is configured to be intelligent enough to route modifications to the buffer hash table 306 to the DRAM 204 and route, i.e. cause the processing module 212 of the database server 202 (shown in FIG. 2) to explicitly execute a flush and a drain operation to clear cache lines, such as cache lines 314 and flush data from the processor cache 222 to at least one buffer, when modifications to buffer descriptor values corresponding to the first type of buffer descriptors are available.

Further, the cache manager 220 is configured to cause the processing module 212 to suppress explicit execution of at least one of a flush operation and a drain operation in relation to updates to buffer descriptor values corresponding to the second type of buffer descriptors. More specifically, modifications to the buffer descriptor values corresponding to the second type of buffer descriptors may eventually be flushed over the cache lines 314 from the processor cache 222 to at least one buffer when the processor cache is full. However, the explicit or routine execution of flush operation (after a store operation) and the drain operation in relation to such modifications is suppressed by the cache manager 220 as the drain operation is a blocking operation and the repeated execution of the flush operation and the drain operation affects a caching performance of the database system 200.

Thus, the routing of modifications to the buffer hash table 306 to the DRAM 204 and the explicit flushing of modifications to the buffer contents and the modifications to the buffer descriptor values for only some type of buffer descriptors by the cache manager 220, as proposed in the present invention, further improve caching performance of the database system 200.

As explained above, modifications to the buffer descriptors are selectively subjected to the execution of the flush and drain operations. In case of modification of buffer contents, the modifications are explicitly flushed, i.e. flushed to the buffer as soon as the modifications are recorded and the store operation is executed by a server process. However, the cache manager 220 is configured to delay execution of a drain operation by the processing module 212 (shown in FIG. 2) till one or more predetermined event occurrences in relation to the flushing of the data to at least one buffer are satisfied. One example of such a predetermined event occurrence is the setting of the I/O-in-progress state 426 after starting the flushing of the data to the buffer. More specifically, the cache manager 220 is configured to delay execution of the drain operation by the processing module 212 till the I/O-in-progress state 426 is set for a buffer selected for receiving the flushed data. Another example of the predetermined event occurrence is the setting of the data-valid state 422 after reading the buffer contents from the storage media 208. More specifically, the cache manager 220 is configured to delay execution of the drain operation by the processing module 212 till the data-valid state 422 is set for the buffer selected for receiving the data. Yet another example of the predetermined event occurrence is the locking and unlocking of the buffer content lock 408 in the exclusive mode. The execution of the drain operation subsequent to locking and unlocking of the content lock 408 is further explained hereinafter:

As explained with reference to FIG. 4, the cache manager 220 is configured to set the dirty state 420 of the flag 416 for a buffer subsequent to a completion of writing data into the respective buffer. It is noted that the flag 416 of the buffer may be set to the I/O-in-progress state 426, when the data is being read into or written from the buffer. However, if the database system 200 (shown in FIG. 2) were to restart on account of a power cycle event or any such initialization event when the data is being written to the buffer, the buffer may include only partially valid data. Indicating such a state of a buffer may require an additional state to be conveyed by the flag 416, which may be inefficient. Accordingly, the cache manager 220 is configured to lock the buffer in the exclusive mode before starting to write data into the buffer, and unlock the buffer after setting the dirty state 420. Further, the cache manager 220 is configured to cause the processing module 212 to execute a drain operation subsequent to the completion of the writing and setting the dirty state 420 for the respective buffer. The drain operation is performed just before the buffer is unlocked, so that all the written data is in the persistent memory 206. If the database system 200 were to undergo a restart event during writing of the data into the buffer, the locked state 418 of the buffer may serve as an indication that writing to the buffer was in progress and was not completed (as the buffer was not unlocked). Thus, use of the locking operation and the execution of the draining operation prior to unlocking the buffer ensure that events causing buffers to include partially valid data are addressed.

In at least one embodiment, subsequent to a system initialization event, the cache manager 220 is configured to identify one or more free buffers from among the plurality of buffers 302 based on the plurality of buffer descriptor values associated with respective buffers. Subsequent to the identification, the cache manager 220 is configured to initialize the plurality of buffer descriptor values for the free buffers, i.e. the cache manager 220 is configured to reset the buffer state 406, the flag 416 and other such buffer descriptor values to default or initial values. For the remaining non-free buffers, the cache manager 220 is configured to determine whether the buffer contents of each buffer need to be persisted or not. In one embodiment, the cache manager 220 is configured to conditionally persist buffer contents in the persistent memory database cache 340 subsequent to a system initialization event based on the respective buffer satisfying one or more predefined conditions. More specifically, only those buffers which satisfy preset conditions are configured to have respective content persisted on the persistent memory 206. For the remaining buffers, the respective buffer descriptor values are initialized.

In one embodiment, the one or more predefined conditions for conditionally persisting the buffer content stored in a buffer are deemed to be satisfied if one or more buffer descriptor values associated with the buffer match respective predetermined persistence values. In an illustrative example, the cache manager 220 may check buffer descriptor values for each buffer and if the buffer descriptor values match the respective predetermined persistence values. For example, a predetermined persistence value for the buffer descriptor data-valid state 422 may be a value indicating that the data in the buffer is valid. Similarly, a predetermined persistence value for the buffer descriptor tag-valid state 424 may be a value indicating that the buffer tag of the buffer is valid. A predetermined persistence value for the buffer descriptor I/O-in-progress state 426 may be a value indicating that no I/O is in progress. A predetermined persistence value for the buffer descriptor dirty state 420 may be a value indicating that the buffer contents are not dirty. In one illustrative example, the cache manager 220 may check buffer descriptor values for each buffer and if the buffer descriptor values match the respective predetermined persistence values to indicate the following conditions: (1) the data-valid state 422 and tag-valid state 424 indicate that the data and tag of the buffer are valid, respectively, (2) the I/O-in-progress state 426 indicates that no I/O is in progress, (3) the dirty state 420 indicates that the buffer contents are not dirty, (4) the content lock 408 is not held in the exclusive mode and (5) the predefined reference indicator (i.e. the signed integer value) is not set to '−3' indicating that the buffer is not assigned to a bulk type of operation. If all the above conditions are true, the cache manager 220 is configured to ensure that the buffer contents are persisted. On determining that the buffer contents for a buffer are to be persisted, the cache manager 220 is configured to perform at least one of: (1) clear the buffer state 406 (including the reference count 412 and the usage count 414 and the flag 416), (2) add the buffer to the buffer hash table 306 using the corresponding buffer tag, and (3) initialize the content lock. However, if it is determined by the cache manager 220 that buffer contents corresponding to a buffer are not to be persisted as one or more buffer descriptor values associated with the buffer do not match the respective predetermined persistence values, then the cache manager 220 is configured to clear the buffer states and the buffer tag, add the buffer to the free list and initialize the content lock 408. Such conditional persistence of cached contents further optimizes buffer space utilization and thereby improves caching performance. The cache manager 220 is also configured to selectively persist contents of buffers assigned to bulk type of operations as will be explained next with reference to FIG. 5.

Figure 5:
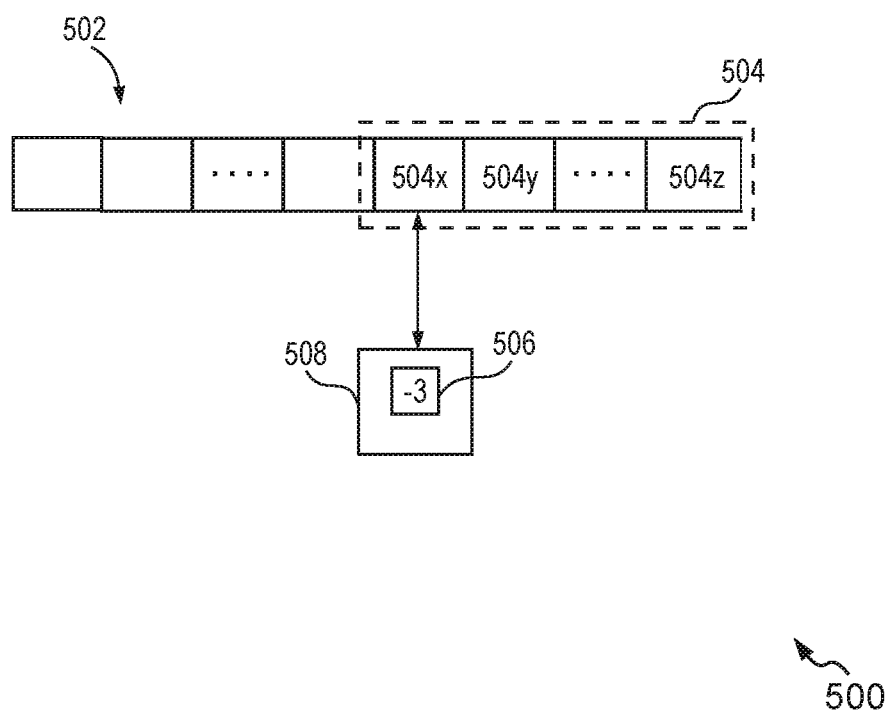
FIG. 5 is a block diagram illustrating an example allocation of buffers from among the plurality of buffers for bulk type of operations, in accordance with an embodiment of the invention.

FIG. 5 is a block diagram 500 illustrating an example allocation of buffers from among the plurality of buffers for bulk type of operations in accordance with an embodiment of the invention. As explained with reference to FIGS. 3 and 4, the persistent memory database cache 340 includes a plurality of buffers and each buffer is associated with buffer metadata, which includes a plurality of buffer descriptor values. One or more buffers from among the plurality of buffers may be selected (i.e. assigned) to a server process, when the server process intends to write data to a database. The assigned buffers are locked in an exclusive mode and thereafter unlocked when the writing to the buffer is complete and the state of the buffer is marked to the dirty state 420 (shown in FIG. 4).

In some embodiments, a server process may wish to execute a special type of write operation, such as an operation which requires transfer of bulk data in a single operation. Such operations are referred to herein as bulk type of operations. Some non-limiting examples of such operations include large multi-block database write operations, such as COPY IN and stale/dead row cleanup operations like VACUUM. In most cases, the requirement for transfer of the bulk data is a one-time operation and accordingly, the bulk data does not need to be persisted in the buffers of the persistent memory database cache 340. Accordingly, in at least one embodiment, the cache manager 220 is configured to assign a subset of buffers from among the plurality of buffers in response to a receipt of a bulk type of operation. Accordingly, in FIG. 5, a subset of buffers 504 is depicted to be assigned from among the plurality of buffers 502 for receiving bulk type of data. The buffers, such as buffers 504x, 504y to 504z in the subset of buffers 504 are capable of being recycled and repeatedly used for caching data in relation to a bulk type of operation. It is noted that the subset of buffers is a negligibly small percentage of the entire buffer cache provided by the persistent memory database cache 340.

Further, the cache manager 220 is configured to assign a predefined link reference value as part of buffer metadata corresponding to each buffer assigned to cache data in relation to the bulk type of operation. As one illustrative example, the predefined link reference value 506 is shown as signed integer '−3' in buffer metadata 508 corresponding to the buffer 504x. It is understood that remaining buffers in the subset of buffers 504 may also include link reference values as −3 in respective buffer metadata.

As explained with reference to FIG. 1, in the event of a system initialization event, the cache manager 220 is configured to check the buffer descriptor values for each buffer and conditionally persist cached contents in the buffer based on the buffer descriptor values matching respective predetermined persistence values. An example predetermined persistence value for the buffer descriptor link reference 410 (shown in FIG. 4) may be a value of −3, indicating that the buffer is not present in the free list, as well as to indicate that the buffer is assigned to a special type of operation, such as the bulk type of operation. The cache manager 220 is configured to detect buffers from such operations by matching the link reference values of the buffers with a '−3' value and ensure that such buffers are not persisted after a system initialization event. More specifically, during a system initialization, the cache manager 220 may identify such buffers by checking the link reference value, which may indicate that the respective buffer is not free and further the '−3' signed integer may indicate that the buffer contents do not need to be persisted across a system initialization event. Accordingly, the cache manager 220 is configured to clear the buffer states and the buffer tag for each buffer in the subset of buffers 504 and add the respective buffers to the free list and initialize the content lock for the respective buffers.

Moreover, since the subset of buffers 504 is continually over-written during the operations, flushing and draining of the cache lines, such as the cache lines 314 (shown in FIG. 3) for these buffers can dramatically increase the time to complete the entire operation. Accordingly, the cache manager 220 is configured to cause the processing module 212 of the database server 202 to suppress explicit execution of at least one of a flush operation and a drain operation in relation to each buffer assigned with the predefined link reference value, i.e. with the −3 signed integer value to further optimize the caching performance.

Figure 6:
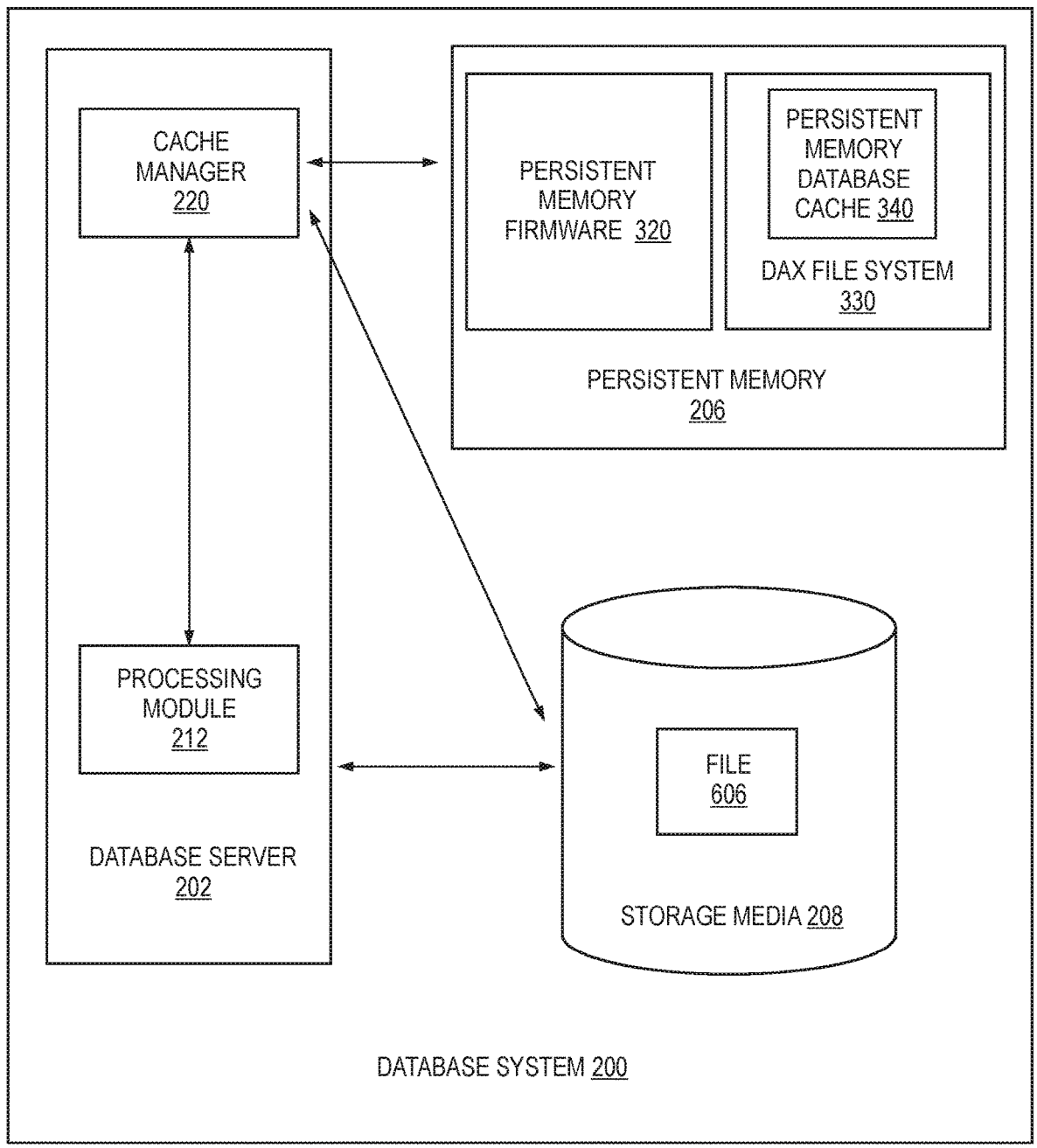
FIG. 6 is a block diagram for illustrating handling of hardware errors in the persistent memory by a cache manager, in accordance with an embodiment of the invention.

FIG. 6 is a block diagram 600 for illustrating handling of hardware errors in the persistent memory 206 by the cache manager 220, in accordance with an embodiment of the invention.

As explained with reference to FIGS. 2 and 3, the persistent memory 206 includes the DAX file system 330. The DAX file system 330 is configured to map buffers in the persistent memory 206 to original copies of the data stored in the storage media 208. The DAX file system 330 is configured to provide direct application-like access (i.e. byte addressable access) to buffers in the persistent memory database cache 340 of the persistent memory 206.

During system initialization, the database server 202 may mount the DAX file system 330 and map a file (not shown in FIG. 6) in the DAX file system 330 to bring up a persistent memory database cache 340 and make it available to the applications (or server processes). It is noted that only limited components of the database system 200 and the database server 202, which are explained with reference to FIG. 2, are shown in FIG. 6 for illustrating the handling of hardware errors in the persistent memory 206 by the cache manager 220.

In addition to storing data corresponding to the plurality of buffers and the metadata corresponding to each buffer (not shown in FIG. 6), the persistent memory 206 stores persistent memory firmware 320, which is conjunction with the cache manager 220, is configured to perform several memory management related functions of the persistent memory 206. One such memory management function is the detection of hardware errors in the persistent memory, or more specifically in the persistent memory database cache 340. The hardware errors may include uncorrectable memory errors, also known as bad blocks or the error may have been caused due to unsafe or dirty shutdown on the persistent memory 206, where in-flight data might have not been flushed to the storage media 208 during a power-down sequence of the database system 200 or a shutdown event of the persistent memory 206.

In conventional methods, subsequent to detection of bad blocks in a persistent memory, the recommended recovery action is to remap bad blocks to the good blocks and restore data from a good copy into these remapped blocks. However, recovering individual blocks may be complex and may consume time. Alternatively, discarding all the data and performing a full restore could be time consuming and delay the server process from getting initialized.

The cache manager 220 of the present invention is configured to enable the persistent memory 206 to recover from hardware errors, yet be able to initialize the database system 200 without any delay. During initialization, the cache manager 220 is configured to query the persistent memory firmware 320 to determine if any bad blocks are present in the persistent memory 206. Subsequent to detecting a presence of the at least one bad block in the persistent memory 206, the cache manager 220, in conjunction with the processing module 212 executing instructions stored in the memory module 214, is configured to stop the initialization and pause the bring-up of the persistent memory database cache 340 (shown in FIG. 3). The cache manager 220 is configured to cause the processing module 212 to unmount the DAX file system 330 associated with the persistent memory database cache 340 and initiate removal of the bad blocks. The term 'removal of bad blocks' as used herein implies discarding of mapping (i.e. pointers) of bad blocks and allocating new good blocks from a free pool to configure the buffers of the persistent memory database cache 340. The cache manager 220 is then configured to remount the DAX memory file system 330 associated with the persistent memory 206 subsequent to a removal of the one or more bad blocks. Subsequent to the remounting of the DAX file system 330, the cache manager 220 causes a removal of content cached in the plurality of buffers to initiate a fresh initialization of the persistent memory 206, or more specifically a fresh initialization of the persistent memory database cache 340. The cache manager 220 restores at least a part of the content cached in the plurality of buffers based on the DAX file system 330 associated with the plurality of buffers. More specifically, the cache manager 220 is configured to cause the database system 200 to start the system initialization, and the processing module 212 of the database server 202 to initialize the persistent memory 206 freshly without retaining any old data. In at least one embodiment, a file 606 may be stored in a known location, such as on the persistent memory 206 or on the storage media 208 (shown in FIG. 2) that is accessed by both the cache manager 220 and processing module 212. The file 606 serves as a flag with a Boolean value. The absence of the file 606 indicates that the processing module 212 of the database server 202 has to start afresh without persisting buffers, while the presence of the file 606 indicates that the buffers have to be persisted. The cache manager 220 is configured to remove the file 606 upon detecting hardware errors, and the database server 202 recreates the file 606 upon restarting after a recovery.

In at least some embodiments, the cache manager 220 is configured to treat all buffers in the persistent memory database cache 340 as non-persistent and perform at least one of the following actions for all buffers: (1) clear the buffer state 406 and the flag 416 for each buffer, (2) add each buffer to the free list and, (3) initialize the content lock 408. Thereafter, the database server 202 is configured to complete the rest of the initialization instantly without needing to restore any data to the buffer cache in the persistent memory 206. The cache then warms up gradually from the on-disk copy of the table files, using existing database caching algorithms.

Figure 7:
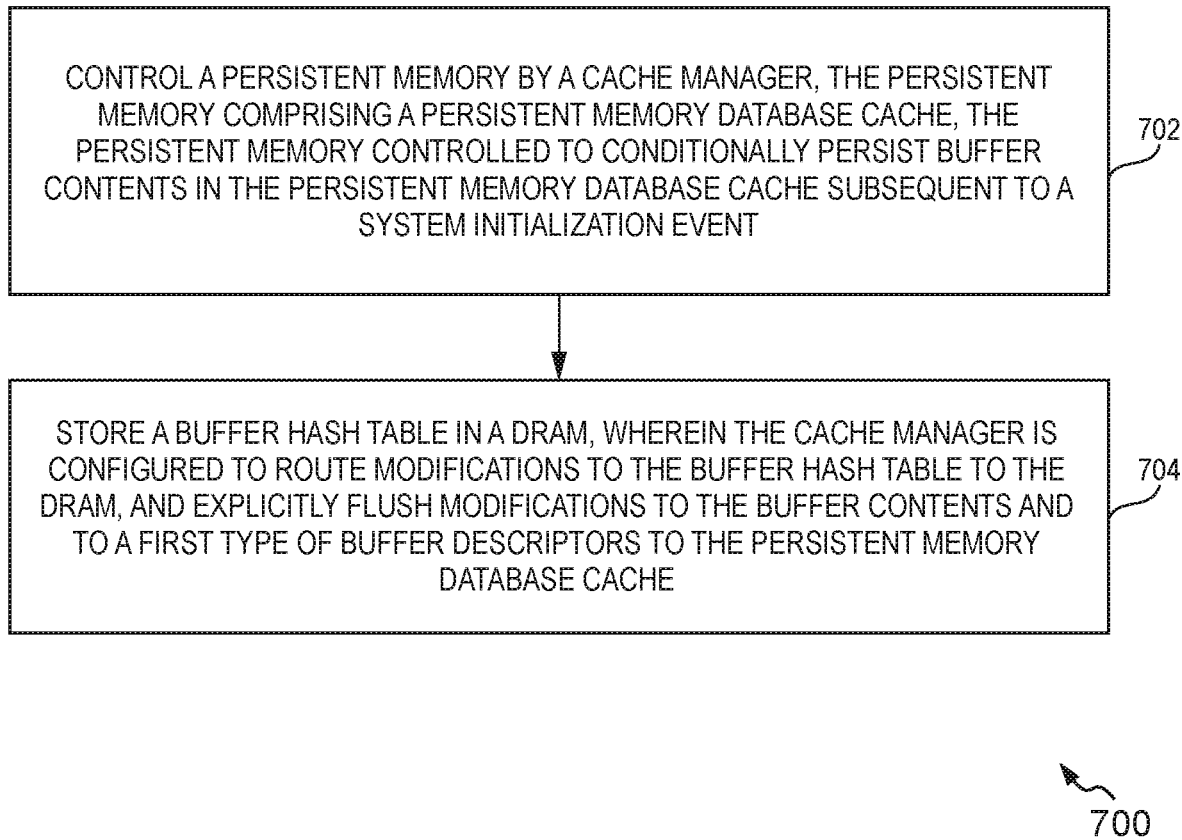
FIG. 7 shows a flow diagram of a method for operating a database system, in accordance with an embodiment of the invention.

FIG. 7 shows a flow diagram of a method 700 for operating a database system, in accordance with an embodiment of the invention. The various steps and/or operations of the flow diagram, and combinations of steps/operations in the flow diagram, may be implemented by, for example, hardware, firmware, a processor, circuitry and/or by a cache manager such as a cache manager 220 in conjunction with a processing module, such as a processing module 212 explained with reference to FIGS. 2 to 6 and/or by a different device associated with the execution of software that includes one or more computer program instructions. The method 700 starts at operation 702.

At operation 702 of the method 700, a persistent memory is controlled by a cache manager in a database server of the database system. The cache manager and the persistent memory as mentioned herein are substantially similar to the cache manager 220 and the persistent memory 206 explained with reference to FIGS. 2 to 6.

The persistent memory includes a persistent memory database cache, such as the persistent memory database cache 340. The persistent memory database cache includes a plurality of buffers and each buffer is capable of storing a copy of data corresponding to at least one page associated with a database from among a plurality of databases stored in at least one storage media of the database system. Further, each buffer is associated with a plurality of buffer descriptor values corresponding to a plurality of buffer descriptors. The plurality of buffer descriptors includes a first type of buffer descriptors and a second type of buffer descriptors. In at least one embodiment, buffer descriptors, such as a buffer tag, a buffer ID, a flag, a content lock and a link reference configure the first type of buffer descriptors and, buffer descriptors such a reference count and a usage count configure the second type of buffer descriptors. The plurality of buffer descriptors and their classification into one of the first type of buffer descriptors and the second type of buffer descriptors may be performed as explained with reference to FIGS. 3 and 4. The plurality of buffer descriptor values corresponding to the plurality of buffer descriptors for each buffer is stored in the persistent memory database cache.

The buffer content stored in a buffer of the persistent memory database cache is conditionally persisted subsequent to a system initialization event based on the respective buffer satisfying one or more predefined conditions. The one or more predefined conditions for conditionally persisting the copy of the data stored in the respective buffer are deemed to be satisfied if one or more buffer descriptor values associated with the buffer match respective predetermined persistence values. The conditional persistence of the buffer content based on a comparison of the buffer descriptor values of the buffer with predetermined persistence values may be performed as explained with reference to FIGS. 3 and 4 and is not explained again herein.

At operation 704 of the method 700, a buffer hash table is stored in a Dynamic Random Access Memory (DRAM) associated with the database system. The cache manager is in operative communication with the DRAM. The modifications to the buffer hash table are routed to the DRAM and the modifications to the buffer content and modifications to the buffer descriptor values corresponding to the first type of buffer descriptors are explicitly flushed to the persistent memory database cache in the persistent memory. The routing of the modifications to the buffer hash table and the explicit flushing of modifications to the buffer content and buffer descriptor values corresponding to the first type of buffer descriptors may be performed as explained with reference to FIGS. 3 and 4.

The cache manager is configured to intelligently manage the caching of database contents on the persistent memory database cache. For example, the cache manager is configured to cause the database server (i.e. a processing module in the database server) to either delay execution of a drain operation or suppress explicit execution of one of the flush operation and the drain operation for certain type of operations to ensure cache persistence, while at the same time improve caching efficiency. For example, the cache manager causes the database server to suppress explicit execution of the flush and drain operations with respect to modifications to certain type of buffer metadata or with respect to bulk type of operations as explained with reference to FIGS. 3, 4 and 5.

Further, the cache manager is also configured to handle hardware errors in the persistent memory 206 such that a system initialization time is reduced. The handling of the hardware errors by the cache manager may be performed as explained with reference to FIG. 6.

Various embodiments disclosed herein provide numerous advantages. The techniques disclosed herein suggest techniques for intelligently managing database cache in database systems. The use of persistent memory, such as the persistent memory 206, enables cost-effective scaling of the database storage architecture as scaling the persistent memory is not as cost prohibitive as scaling expensive DRAM. Further, being on persistent memory, the contents of the cache are persisted across system initialization events, such as planned restarts or power cycle events. As a result, the concern of query latency variance is also addressed, since the contents of the cache are always warm across restarts of the database system. Further, conditional persistence of cached contents further optimizes buffer space utilization and thereby improves caching performance.

The storing of the buffer hash table in the DRAM and the buffers and the respective buffer metadata in the persistent memory, as proposed in the present invention, improves caching performance as the buffer tag lookup may be quickly performed in the DRAM. The execution of flush and drain operations is also optimized to improve caching efficiency while at the same time ensuring cache persistence. The hardware errors in the persistent memory database cache are elegantly handled in a manner that the system initialization time is reduced.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the database server 202 and its various components such as the processing module 212, the memory module 214, the I/O module 216, the communication module 218 and the cache manager 220 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to the cache manager 220). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A database system, the database system comprising:
a database server, the database server comprising:
   a memory module for storing instructions for creating and operating a plurality of databases,
   a processing module configured to execute the instructions stored in the memory module, the processing module associated with at least one processor cache, and
   a cache manager;
a Dynamic Random Access Memory (DRAM) in operative communication with the database server;
at least one storage media configured to store the plurality of databases; and
a persistent memory controlled, at least in part, by the cache manager, the persistent memory comprising a persistent memory database cache, the persistent memory database cache comprising a plurality of buffers, each buffer capable of storing a copy of data corresponding to at least one page associated with a database from among the plurality of databases, wherein buffer content stored in a buffer of the persistent memory database cache conditionally persisted subsequent to a system initialization event based on the respective buffer satisfying one or more predefined conditions,
   wherein each buffer is associated with a plurality of buffer descriptor values corresponding to a plurality of buffer descriptors, the plurality of buffer descriptors comprising a first type of buffer descriptors and a second type of buffer descriptors, the plurality of buffer descriptor values associated with each buffer stored in the persistent memory database cache,
   wherein the DRAM is configured to store a buffer hash table comprising a plurality of buffer tags and, wherein each buffer tag from among the plurality of buffer tags is capable of uniquely identifying a buffer from among the plurality of buffers,
   wherein modifications to the buffer hash table are routed to the DRAM, and
   wherein modifications to the buffer content and modifications to buffer descriptor values corresponding to the first type of buffer descriptors are explicitly flushed to the persistent memory database cache in the persistent memory.

2. The database system of claim 1, wherein the memory module is further configured to store instructions for creating and operating a plurality of server processes in relation to a plurality of database clients and, wherein each server process created and operated in relation to a database client is associated with at least one database from among the plurality of databases.

3. The database system of claim 2, wherein the processing module is configured to trigger a flush operation subsequent to a store operation executed by a server process, wherein the flush operation is configured to cause flushing of data corresponding to the store operation and, wherein the data is flushed from the at least one processor cache to at least one buffer from among the plurality of buffers.

4. The database system of claim 3, wherein the cache manager is configured to delay a drain operation executed by the processing module till one or more predetermined event occurrences in relation to the flushing of the data to the at least one buffer are satisfied.

5. The database system of claim 1, wherein the plurality of buffer descriptors comprises at least one buffer descriptor from among a buffer tag, a buffer identification (ID), a buffer state, a content lock and a link reference of a free list chain and, wherein the buffer state is configured to indicate a current state of a respective buffer using at least one of a reference count, a usage count and a flag.

6. The database system of claim 5, wherein the buffer tag, the buffer ID, the flag, the content lock and the link reference configure the first type of buffer descriptors and, wherein the reference count and the usage count configure the second type of buffer descriptors.

7. The database system of claim 6, wherein the cache manager is configured to cause the processing module to suppress explicit execution of at least one of a flush operation and a drain operation in relation to modifications to buffer descriptor values corresponding to the second type of buffer descriptors.

8. The database system of claim 1, wherein the one or more predefined conditions for conditionally persisting the buffer content stored in the buffer are deemed to be satisfied if one or more buffer descriptor values associated with the buffer match respective predetermined persistence values.

9. The database system of claim 1, wherein a subset of buffers from among the plurality of buffers is capable of being recycled and repeatedly used for caching data in relation to a bulk type of operation, wherein the bulk type of operation corresponds to an operation requiring transfer of bulk data in a single operation.

10. The database system of claim 9, wherein each buffer in the subset of buffers is assigned a predefined link reference value subsequent to a selection of the respective buffer for caching the data in relation to the bulk type of operation and, wherein the cache manager is configured to cause the processing module to suppress explicit execution of at least one of a flush operation and a drain operation in relation to each buffer associated with the predefined link reference value.

11. The database system of claim 1, wherein the cache manager is further configured to:
   determine, during the system initialization event, whether at least one bad block exists in the persistent memory;

cause the processing module to stop system initialization and unmount a file system associated with the persistent memory subsequent to detecting a presence of the at least one bad block in the persistent memory;

facilitate removal of the at least one bad block in the persistent memory;

cause the processing module to restart the system initialization and remount the file system associated with the persistent memory subsequent to the removal of the at least one bad block, wherein the processing module is caused to perform a fresh initialization of the persistent memory; and restore at least a part of a content cached in the plurality of buffers based on the file system.

12. A method for operating a database system, the method comprising:

controlling a persistent memory by a cache manager in a database server of the database system, the persistent memory comprising a persistent memory database cache, the persistent memory database cache comprising a plurality of buffers, each buffer capable of storing a copy of data corresponding to at least one page associated with a database from among a plurality of databases stored in at least one storage media of the database system, wherein buffer content stored in a buffer of the persistent memory database cache is conditionally persisted subsequent to a system initialization event based on the respective buffer satisfying one or more predefined conditions; and storing a buffer hash table in a Dynamic Random Access Memory (DRAM) associated with the database system, the cache manager in operative communication with the DRAM, wherein each buffer is associated with a plurality of buffer descriptor values corresponding to a plurality of buffer descriptors, the plurality of buffer descriptors comprising a first type of buffer descriptors and a second type of buffer descriptors, the plurality of buffer descriptor values associated with each buffer stored in the persistent memory database cache, wherein modifications to the buffer hash table are routed to the DRAM and, wherein modifications to the buffer content and modifications to buffer descriptor values corresponding to the first type of buffer descriptors are explicitly flushed to the persistent memory database cache in the persistent memory.

13. The method of claim 12, further comprising, performing by the cache manager:

causing the database server to delay execution of a drain operation till one or more predetermined event occurrences in relation to the flushing of data to the at least one buffer are satisfied, wherein the data is flushed into the at least one buffer from at least one processor cache associated with the database server in response to a flush operation executed by the database server.

14. The method of claim 12, wherein the plurality of buffer descriptors comprises at least one buffer descriptor from among a buffer tag, a buffer identification (ID), a buffer state, a content lock and a link reference of a free list chain, wherein the buffer state is configured to indicate a current status of a respective buffer using at least one of a reference count, a usage count and a flag, wherein the buffer tag, the buffer ID, the flag, the content lock and the link reference configure the first type of buffer descriptors and, wherein the reference count and the usage count configure the second type of buffer descriptors, and wherein the cache manager is configured to cause the database server to suppress explicit execution of at least one of a flush operation and a drain operation in relation to modifications to buffer descriptor values corresponding to the second type of buffer descriptors.

15. The method of claim 12, wherein the one or more predefined conditions for conditionally persisting the buffer content stored in the buffer are deemed to be satisfied if one or more buffer descriptor values associated with the buffer match respective predetermined persistence values.

16. The method of claim 12, further comprising, performing by the cache manager:

assigning a subset of buffers from among the plurality of buffers for caching data in relation to a bulk type of operation, the subset of buffers capable of being recycled and repeatedly used for caching the data in relation to the bulk type of operation, wherein the bulk type of operation corresponds to an operation requiring transfer of bulk data in a single operation;

assigning a predefined link reference value to each buffer in the subset of buffers subsequent to a selection of the respective buffer for caching the data in relation to the bulk type of operation; and causing the database server to suppress explicit execution of at least one of a flush operation and a drain operation in relation to each buffer associated with the predefined link reference value.

17. The method of claim 12, further comprising, performing by the cache manager:

determining, during the system initialization event, whether at least one bad block exists in the persistent memory;

causing the database server to stop system initialization and unmount a file system associated with the persistent memory subsequent to detecting a presence of the at least one bad block in the persistent memory;

facilitating removal of the at least one bad block in the persistent memory;

causing the database server to restart the system initialization and remount the file system associated with the persistent memory subsequent to the removal of the at least one bad block, wherein the database server is caused to perform a fresh initialization of the persistent memory; and restoring at least a part of a content cached in the plurality of buffers based on the file system.

18. A cache manager, the cache manager comprising:

a communication module, the communication module configured to enable the cache manager to communicate with a database server and a Dynamic Random Access Memory (DRAM), the DRAM storing a buffer hash table; and an instruction module for storing instructions for operating a persistent memory, the persistent memory comprising a persistent memory database cache, the persistent memory database cache comprising a plurality of buffers, each buffer associated with a plurality of buffer descriptor values corresponding to a plurality of buffer descriptors, the plurality of buffer descriptors comprising a first type of buffer descriptors and a second type of buffer descriptors, the plurality of buffer descriptor values corresponding to the plurality of buffer descriptors for each buffer stored in the persistent memory database cache, wherein at least one instruction from among the instructions is configured to conditionally persist buffer contents in the persistent memory database cache subsequent to a system initialization event and, wherein at least one instruction from among the instructions is configured to facilitate routing of modifications to the buffer hash table to the DRAM and explicit flushing of modifications to the buffer contents and modifications to buffer descriptor values corresponding to the first type of buffer descriptors to the persistent memory database cache.

19. The cache manager of claim 18, wherein the cache manager is further configured to:

assign a subset of buffers from among the plurality of buffers for caching data in relation to a bulk type of operation, the subset of buffers capable of being recycled and repeatedly used for caching data in relation to the bulk type of operation, wherein the bulk type of operation corresponds to an operation requiring transfer of bulk data in a single operation;

assign a predefined link reference value to each buffer in the subset of buffers subsequent to a selection of the respective buffer for caching data in relation to the bulk type of operation; and cause the database server to suppress explicit execution of at least one of a flush operation and a drain operation in relation to each buffer associated with the predefined link reference value.

20. The cache manager of claim 18, wherein the cache manager is further configured to:

determine, during the system initialization event, whether at least one bad block exists in the persistent memory;

cause the database server to stop system initialization and unmount a file system associated with the persistent memory subsequent to detecting a presence of the at least one bad block in the persistent memory;

facilitate removal of the at least one bad block in the persistent memory;

cause the database server to restart the system initialization and remount the file system associated with the persistent memory subsequent to the removal of the at least one bad block, wherein the database server is caused to perform a fresh initialization of the persistent memory; and restore at least a part of a content cached in the plurality of buffers based on the file system.

* * * * *